Aug. 24, 1948.    J. ROBINSON    2,447,536
CONTAINER CLOSURE
Filed May 23, 1945
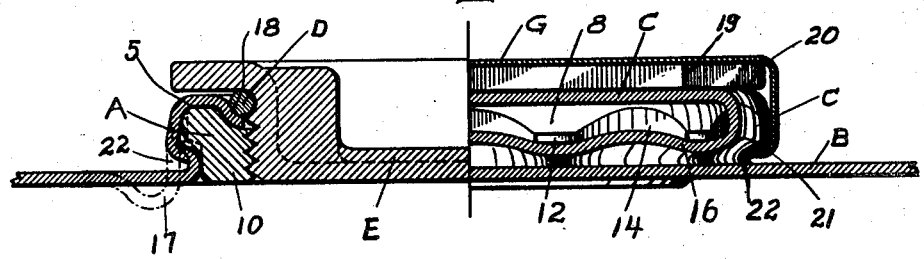
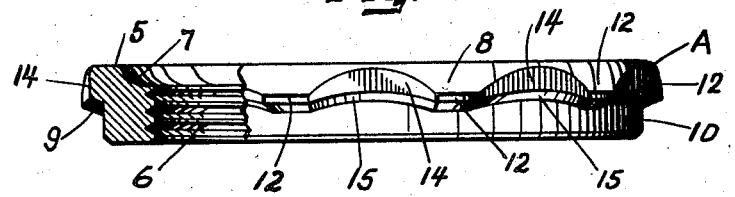
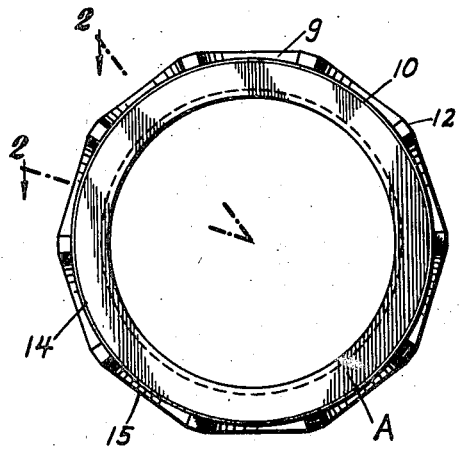
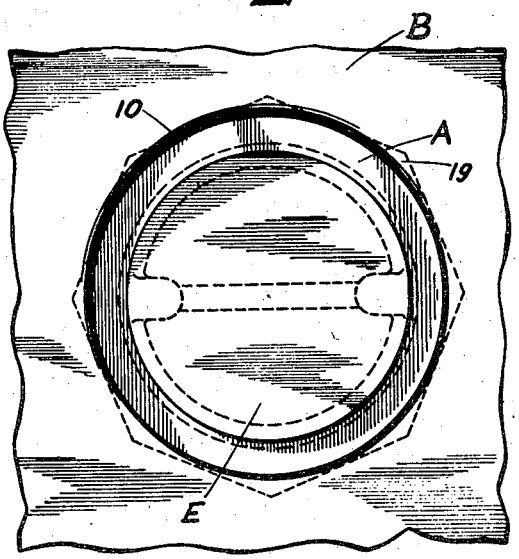
INVENTOR.
Joseph Robinson
BY
Blair, Curtis & Hayward
ATTORNEYS.

Patented Aug. 24, 1948

2,447,536

UNITED STATES PATENT OFFICE 2,447,536

CONTAINER CLOSURE

Joseph Robinson, New York, N. Y.

Application May 23, 1945, Serial No. 595,344

5 Claims. (Cl. 285—49)

Among the objects of the present invention is generally to simplify and improve closures of the type shown in my co-pending application, Serial No. 565,461, filed November 28, 1944, and in particular to simplify insertion in the drum head of the threaded ring or insert and firmly lock it against rotation therein. Other objects and novel features of my invention will appear from the following description, in the appended claims and in the construction and arrangement of parts listed in the accompanying drawings in which Figure 1 is a vertical section through my improved closure;

Figure 2 is a side elevation of the threaded insert of my invention showing a part thereof cut away at approximately the line 2—2 of Figure 3;

Figure 3 is a bottom view of the threaded insert shown in Figure 2, and

Figure 4 is a bottom view of the construction shown in Figure 1.

My improvement comprises an internally threaded insert or ring A, die cast or otherwise formed in one or more pieces, having a flat annular face 5 between which and the threads 6 a curved bearing 8 (Figure 2) is formed. The edge 8 of the insert extends downwardly from the face 5 for a distance approximating half the height of the insert, and thence inwardly to form a shoulder or seat 9 which terminates in a cylindrical shank 10, Figure 4. Between the shoulder 9 and the flat face 5 I provide the edge 8 of the insert with a plurality of flats 11, the corners 12 of which flare or curve inwardly and the center portion 14 of which (Figure 2) is substantially vertical. Between the corners 12 the shoulder 9 curves upwardly to form a seat 15 into which the metal 16 of the housing C moves and interlocks therewith during assembly, thus firmly preventing rotation of the insert in the drum head. The housing is pressed from the drum stock, and is provided at its bottom with an annular bead 17 shown in dotted lines in Figure 1. During assembly this bead is rolled over the shoulder 9 causing the metal of the housing to be wrapped "skin-tight" around the insert A in the interlocked relationship mentioned. The housing is provided with a gasket seat 18 which fits closely in its complementary bearing 7 on the insert. The arrangement is such that when the insert is placed in the housing the gasket seat 18 engages its bearing 7 in advance of engagement between the housing and the flat face 5 of the insert. This assures that when the bead or bottom 17 of the housing is turned over the shoulder 9, drawing the housing into tight engagement with the face 5 and into interlocked wedging engagement with the surfaces 12, 14 and 15 of the insert A, the gasket seat 18 will be locked in place under tension, thus effectively preventing at all times any vertical movement of the gasket seat with respect to its bearing 7. A suitable gasket F, carried by the threaded plug E, engages the seat 18 and is compressed therein when the plug is screwed into the insert A to bring its flange 19 into engagement with the top of the housing C as shown at 20 in Figure 1.

To prevent undisclosed tampering with the contents of the drum, and to facilitate identification of its contents, a thin cap or cover G (Figure 1), painted or embossed as desired, and removable on destruction, is set over the plug E and housing C and extends downward to a point near the drum head B. By means of a suitable tool, the lower edge 21 of the cap is crimped or rolled into the external annular groove 22 of the housing.

The improvements described produce a simple, rugged closure that is easy to insert in the drum head and which at all times will be positively locked against vertical or rotary movement therein.

What I claim is:

1. In a closure receiving ring-like insert for a metal container, in combination, a wall of the container having an opening defined by an outwardly extending sleeve, the outer end portion of the sleeve having an annular inwardly directed right-angle flange formed with a depressed marginal gasket receiving seat, and an externally flanged ring-like insert disposed within said sleeve and having an annular depression formed to receive the depressed seat portion of the sleeve, a portion of the metal forming the inner end of the sleeve being forced into engagement with said insert beneath the flange of the latter so as to firmly grip and maintain the insert within said sleeve, with the opposite end of the insert substantially flush with the inner face of the container wall.

2. In a closure receiving ring-like insert for a metal container, in combination, in accordance with claim 1 wherein the external flange of the insert is formed with a plurality of spaced circumferentially arranged upwardly arched portions, the walls defining the arched portions facing downwardly and outwardly from the ring-like body of the insert.

3. In a closure receiving ring-like insert for a metal container, in combination, in accordance with claim 1, wherein the external flange of the insert is formed with a plurality of spaced upwardly arched portions, the outer wall of the flange being provided with a flattened peripheral portion complementary to and merging into each of the arched portions.

4. In a closure receiving ring-like insert for a metal container, in combination, a wall of the container having an opening defined by a sleeve extending outwardly of the container wall, a ring-like insert disposed within the sleeve and having its outer end face formed with a counterbored portion, said insert having its outer end provided with an external flange defining a downwardly facing shoulder, the inner end of the sleeve being forced into engagement with the insert beneath the downwardly facing shoulder, and the remainder of the sleeve being forced into engagement with the remainder of the insert so as to conform to the contour of and to cover the outer face of the insert including the counterbored portion, whereby the inner face of the container wall is disposed and maintained substantially flush with the inner end face of the insert and the outer end of the sleeve overlies the counterbored portion to form a depressed gasket receiving seat.

5. In a closure receiving ring-like insert for a metal container, in combination, a wall of the container having an opening defined by a sleeve extending outwardly of the container wall, a ring-like insert disposed within said sleeve and having its plane outer end face formed with a counterbored portion providing a gasket receiving seat, said insert having its outer end formed with an inwardly facing external shoulder, the inner end portion of the sleeve being forced into engagement with the insert beneath the external shoulder, and the remainder of the sleeve being forced into engagement with the remainder of the insert and terminating within the gasket receiving seat, whereby to maintain the insert against movement relative to the sleeve with the inner end face of the insert substantially flush with the inner face of the container wall.

JOSEPH ROBINSON.

REFERENCES CITED

The following references are of record in the file of this patent:

UNITED STATES PATENTS

| Number | Name | Date |
| --- | --- | --- |
| 1,344,457 | Schroeder | June 22, 1920 |
| 1,517,530 | Boyle | Dec. 2, 1924 |
| 1,651,632 | Rieke | Dec. 6, 1927 |
| 1,830,939 | Golden | Nov. 10, 1931 |
| 2,011,013 | Rieke | Aug. 13, 1935 |
| 2,023,977 | Schwartz | Dec. 10, 1935 |
| 2,084,007 | Schwartz | June 15, 1937 |
| 2,267,754 | Schroeder | Dec. 30, 1941 |

FOREIGN PATENTS

| Number | Country | Date |
| --- | --- | --- |
| 768,153 | France | May 14, 1934 |